United States Patent
Nemoto et al.

(10) Patent No.: US 8,730,792 B2
(45) Date of Patent: May 20, 2014

(54) SWITCHING DEVICE AND SWITCHING METHOD

(75) Inventors: Satoshi Nemoto, Kawasaki (JP); Yukio Suda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 256 days.

(21) Appl. No.: 13/036,227

(22) Filed: Feb. 28, 2011

(65) Prior Publication Data

US 2011/0292806 A1 Dec. 1, 2011

(30) Foreign Application Priority Data

May 27, 2010 (JP) .................................. 2010-121335

(51) Int. Cl.
*G01R 31/08* (2006.01)
(52) U.S. Cl.
USPC ............ 370/217; 370/221; 709/238; 709/239
(58) Field of Classification Search
None
See application file for complete search history.

(56) References Cited

U.S. PATENT DOCUMENTS

| 7,275,175 B2 * | 9/2007 | Cardona et al. ............. 714/4.11 |
| 2003/0223466 A1 * | 12/2003 | Noronha et al. ............ 370/537 |
| 2004/0047286 A1 * | 3/2004 | Larsen et al. ................ 370/216 |
| 2008/0151897 A1 | 6/2008 | Nemoto et al. |
| 2009/0323534 A1 * | 12/2009 | Taylor et al. ................. 370/237 |

FOREIGN PATENT DOCUMENTS

| JP | 04-223692 | 8/1992 |
| JP | 05-268251 | 10/1993 |
| JP | 2004-64619 | 2/2004 |
| JP | 2008-160570 | 7/2008 |

OTHER PUBLICATIONS

Patent Abstracts of Japan, Publication No. 2008-160570, Published Jul. 10, 2008.
Patent Abstracts of Japan, Publication No. 04-223692, Published Aug. 13, 1992.
Patent Abstracts of Japan, Publication No. 05-268251, Published Oct. 15, 1993.
Japanese Office Action mailed Jan. 21, 2014 in corresponding Japanese Application No. 2010-121335.

* cited by examiner

*Primary Examiner* — Donald Mills
(74) *Attorney, Agent, or Firm* — Staas & Halsey LLP

(57) ABSTRACT

Each of a first switching processor and a second switching processor included in a switching device switches plural pieces of data to determined destinations. A controller bypass-transmits a determined number of pieces of data received by the first switching processor to the second switching processor according to a congestion state of the first switching processor to make both of the first switching processor and the second switching processor perform a switching process. Alternatively, the controller bypass-transmits a determined number of pieces of data received by the second switching processor to the first switching processor according to a congestion state of the second switching processor to make both of the first switching processor and the second switching processor perform a switching process.

4 Claims, 19 Drawing Sheets

N :DESTINATION PORT NUMBER

X :SOURCE CARD NUMBER

Y :SEGMENT TRANSMISSION NUMBER

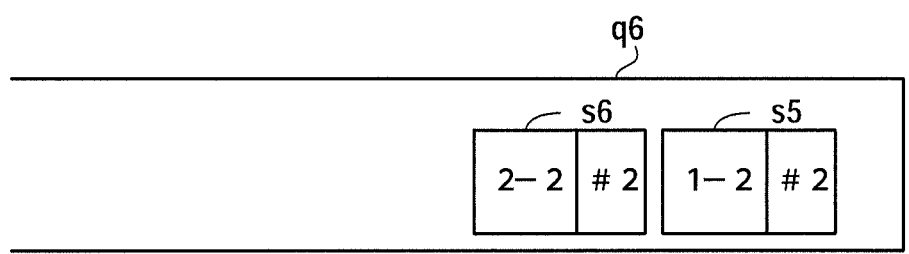
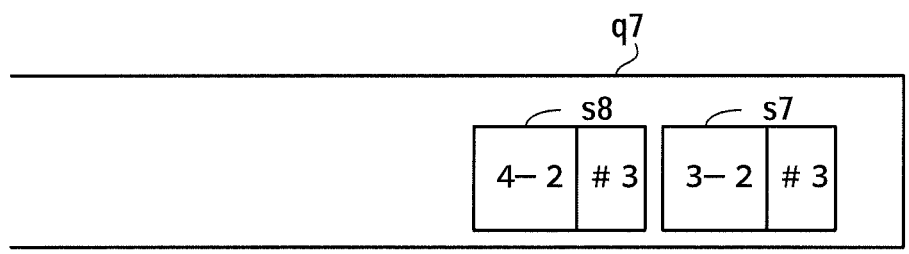
FIG. 8

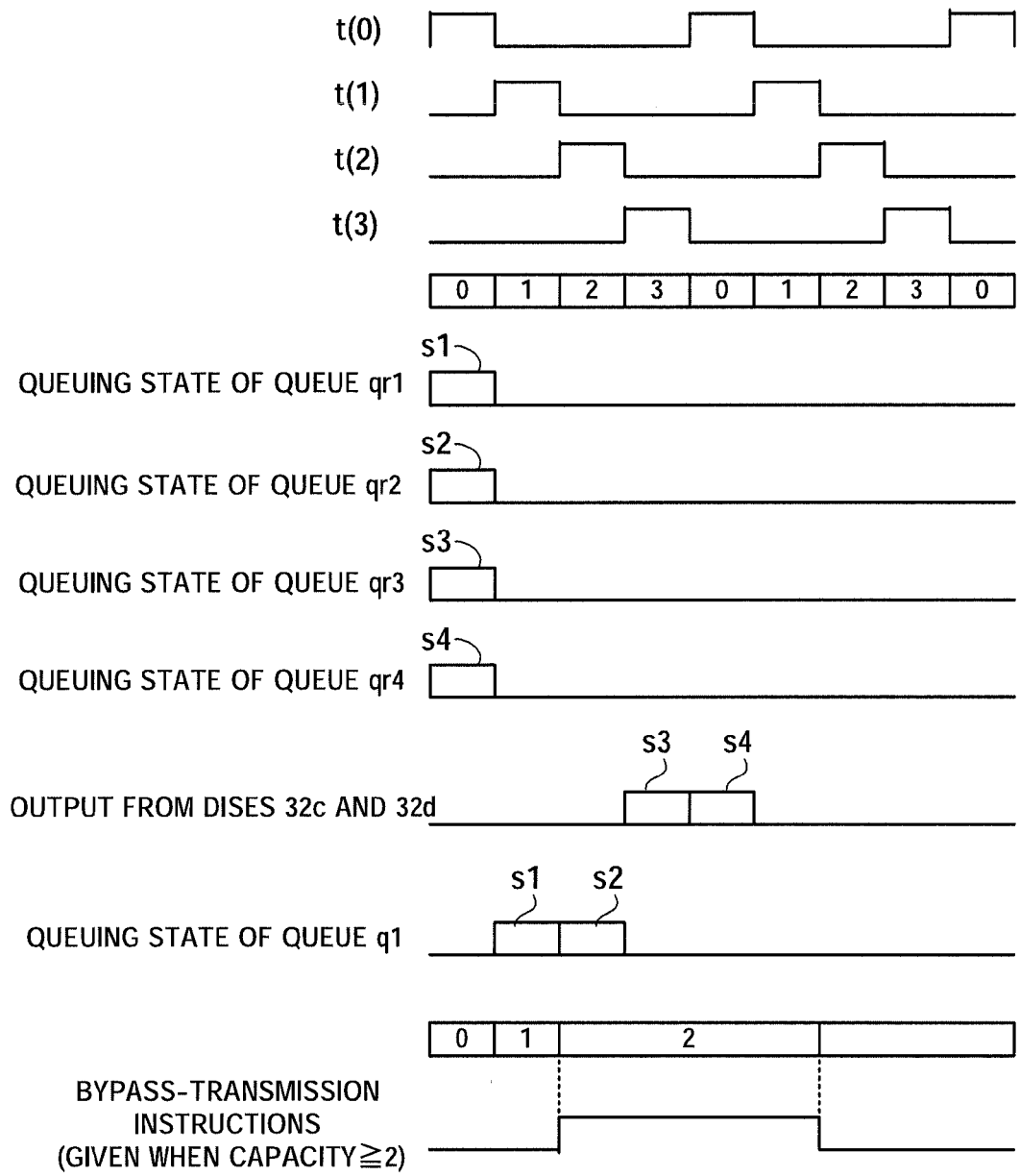

SWITCHING DEVICE AND SWITCHING METHOD

CROSS-REFERENCE TO RELATED APPLICATION

This application is based upon and claims the benefit of priority of the prior Japanese Patent Application No. 2010-121335, filed on May 27, 2010, the entire contents of which are incorporated herein by reference.

FIELD

The embodiments discussed herein are related to a switching device and switching method for performing a switching process.

BACKGROUND

Data communication services using the Internet have made great strides and data communication by IP (Internet Protocol) packets is becoming the mainstream of traffic in the entire data communication.

In particular, a demand for services, such as speech or dynamic image data transmission, which urgently require to be provided on a real-time basis has risen markedly and the capacity of devices has increased markedly because of an increase in data communication speed.

As a result, devices for transmitting large-capacity data over a great distance are shifting to a packet transport system. With SONET (Synchronous Optical Network), SDH (Synchronous Digital Hierarchy), OTN (Optical Transport Network), or the like target data is mapped to frames to be continuously transmitted at a constant transmission rate, and is transmitted. At present there is a shift from SONET, SDH, OTN, or the like to the packet transport system. Accordingly, it is necessary to apply, for example, SONET, SDH, or OTN applications to transmission systems for the purpose of accommodating high speed and large capacity.

With transmission systems, on the other hand, switching devices are used for connecting networks. With an increase in the number of lines or the capacity of lines, the importance of switching devices is increasing and development of high-quality switching devices is expected.

Formerly a switching technique for inserting a plurality of subswitches between speech path stages to avoid link congestion caused by copy cells was proposed (see Japanese Laid-open Patent Publication No. 04-223692). In addition, a switching technique for reducing delay by placing a sequence control circuit for correcting cell sequence inversion was proposed (see Japanese Laid-open Patent Publication No. 05-268251).

With conventional switching devices, however, the following problem, for example, arises. When plural pieces of data transmitted to the same destination concentrate at switching time, data congestion (conflict) occurs. As a result, a transmission delay due to queuing occurs in transmitting data to the same destination.

SUMMARY

According to an aspect of the present invention, there is provided a switching device including a first switching section including a first switching processor which switches plural pieces of data to determined destinations and a controller which controls a switching process and a second switching section including a second switching processor which switches plural pieces of data to determined destinations, the controller bypass-transmitting a determined number of pieces of data received by the first switching processor to the second switching processor according to a congestion state of the first switching processor to make both of the first switching processor and the second switching processor perform a switching process, the controller bypass-transmitting a determined number of pieces of data received by the second switching processor to the first switching processor according to a congestion state of the second switching processor to make both of the first switching processor and the second switching processor perform a switching process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates a queuing state;
FIG. 19 is a time chart of operation.

DESCRIPTION OF EMBODIMENTS

Figure 1:
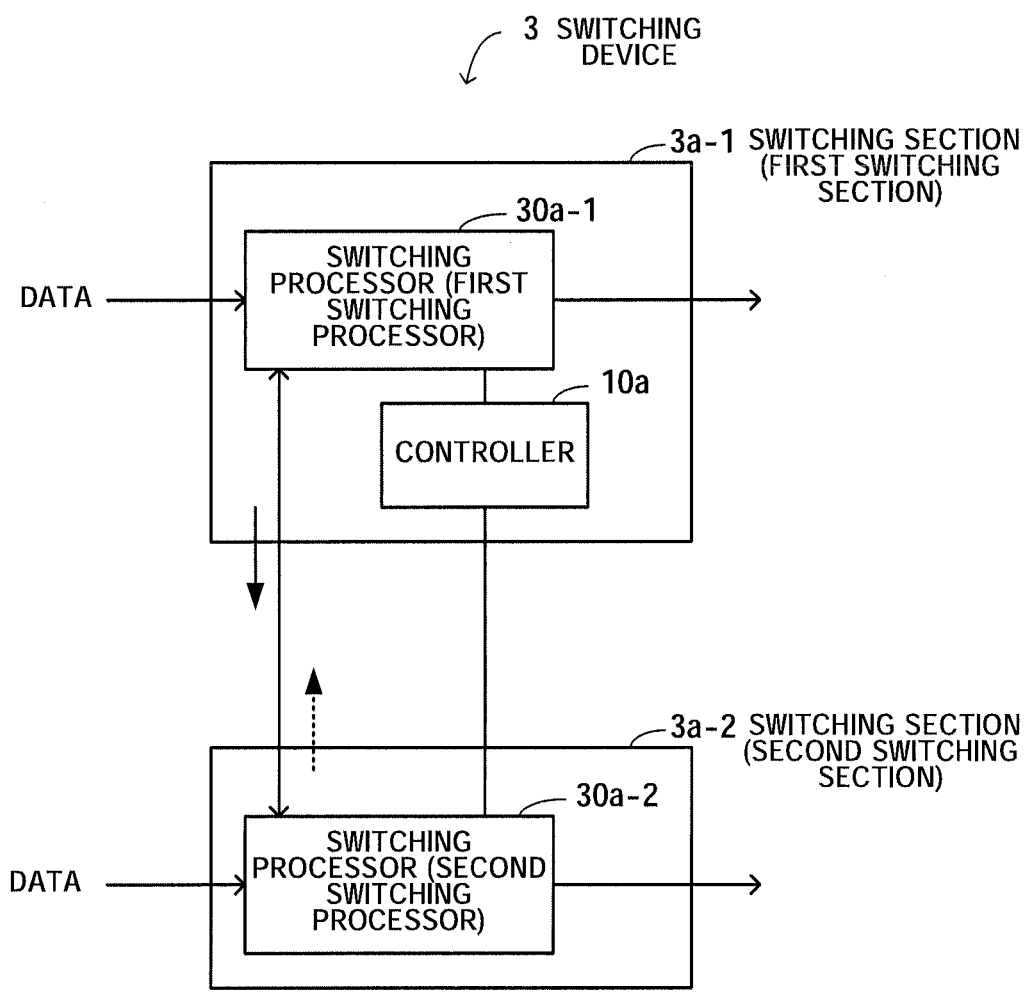
FIG. 1 illustrates an example of the structure of a switching device.

Embodiments of the present invention will now be described with reference to the accompanying drawings. FIG. 1 illustrates an example of the structure of a switching device. A switching device 3 includes a switching section (first switching section) 3a-1 and a switching section (second switching section) 3a-2.

The switching section 3a-1 includes a switching processor (first switching processor) 30a-1 and a controller 10a. The switching section 3a-2 includes a switching processor (second switching processor) 30a-2. The controller 10a is connected to the switching processors 30a-1 and 30a-2. The switching processors 30a-1 and 30a-2 are connected to each other.

Each of the switching processors 30a-1 and 30a-2 switches plural pieces of data received to determined destinations. The controller 10a controls a switching process. The controller 10a bypass-transmits a determined number of pieces of data received by the switching processor 30a-1 to the switching processor 30a-2 according to the congestion state of the switching processor 30a-1 to make both of the switching processor 30a-1 and the switching processor 30a-2 perform a switching process.

Alternatively, the controller 10a bypass-transmits a determined number of pieces of data received by the switching processor 30a-2 to the switching processor 30a-1 according to the congestion state of the switching processor 30a-2 to make both of the switching processor 30a-1 and the switching processor 30a-2 perform a switching process.

A determined number of pieces of data received by one switching processor are bypass-transmitted in this way to the other switching processor according to the congestion state of the one switching processor to make both of the switching processors perform a switching process. By doing so, the number of pieces of data which conflict at switching time can be reduced and a transmission delay can be controlled.

A data congestion (conflict) state which arises at switching time will now be described before the switching device 3 is described. First the structure of an ordinary switching device which does not have the function of the switching device 3 will be described.

Figure 2:
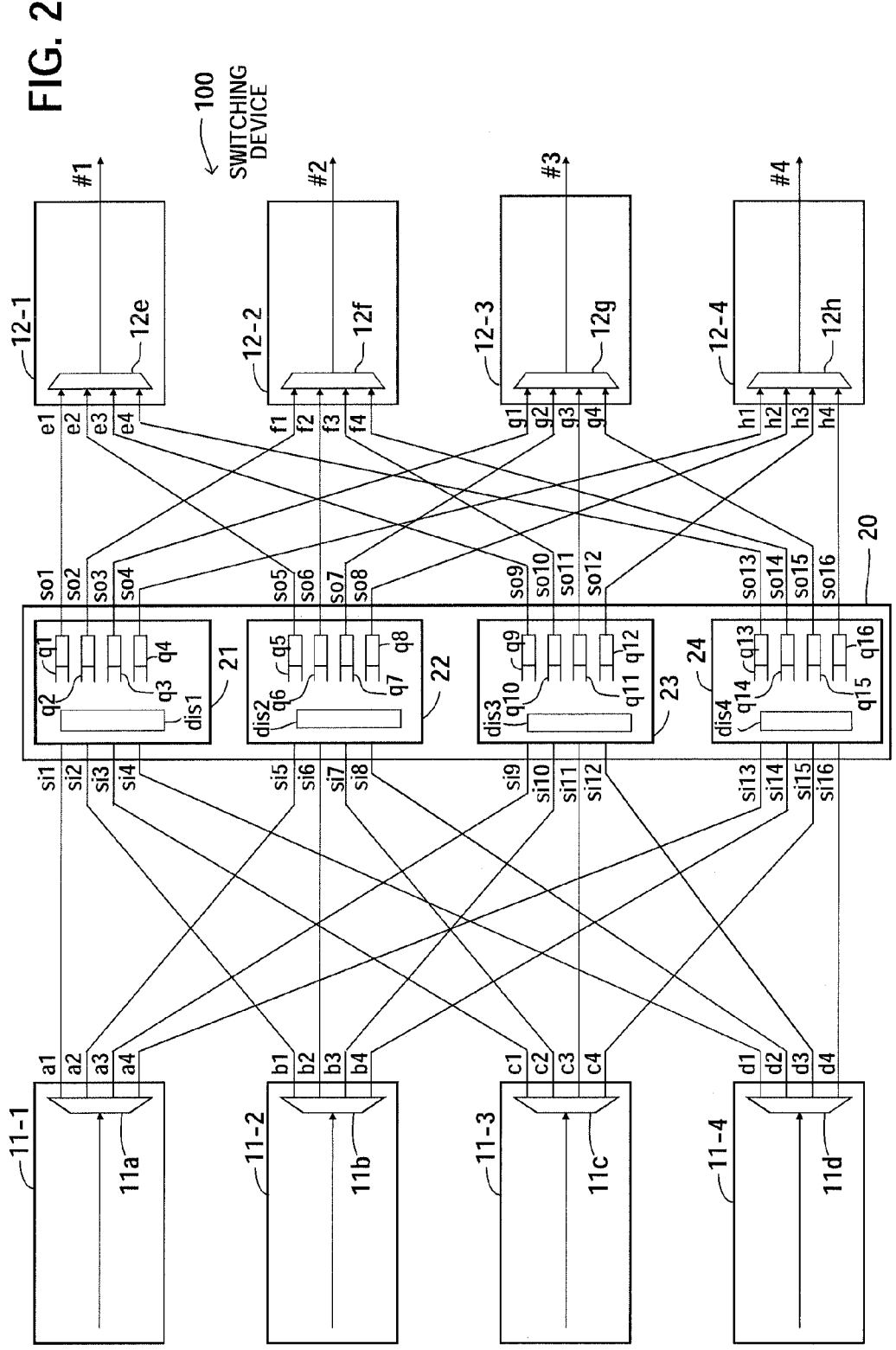
FIG. 2 illustrates an example of the structure of a switching device.

FIG. 2 illustrates an example of the structure of a switching device. A switching device 100 includes input cards 11-1 through 11-4 each of which performs a process at an input-side interface, a switching module 20, and output cards 12-1 through 12-4 each of which performs a process at an output-side interface.

The input cards 11-1 through 11-4 include separation sections 11a through 11d respectively. The output cards 12-1 through 12-4 include multiplexing sections 12e through 12h respectively.

The switching module 20 includes switching chips 21 through 24. The switching chip 21 includes a distribution section dis1 and queues q1 through q4. The switching chip 22 includes a distribution section dis2 and queues q5 through q8.

The switching chip 23 includes a distribution section dis3 and queues q9 through q12. The switching chip 24 includes a distribution section dis4 and queues q13 through q16.

The separation section 11a includes output ports a1 through a4. The separation section 11b includes output ports b1 through b4. The separation section 11c includes output ports c1 through c4. The separation section 11d includes output ports d1 through d4.

The multiplexing section 12e includes input ports e1 through e4. The multiplexing section 12f includes input ports f1 through f4. The multiplexing section 12g includes input ports g1 through g4. The multiplexing section 12h includes input ports h1 through h4.

The switching chip 21 includes input ports si1 through si4 and output ports so1 through so4. The switching chip 22 includes input ports si5 through si8 and output ports so5 through so8.

The switching chip 23 includes input ports si9 through si12 and output ports so9 through so12. The switching chip 24 includes input ports si13 through si16 and output ports so13 through so16.

How these ports are connected will be described. On the input side of the switching module 20 the output port a1 is connected to the input port si1, the output port a2 is connected to the input port si5, the output port a3 is connected to the input port si9, and the output port a4 is connected to the input port si13.

Furthermore, the output port b1 is connected to the input port si2, the output port b2 is connected to the input port si6, the output port b3 is connected to the input port si10, and the output port b4 is connected to the input port si14. Moreover, the output port c1 is connected to the input port si3, the output port c2 is connected to the input port si7, the output port c3 is connected to the input port si11, and the output port c4 is connected to the input port si15.

In addition, the output port d1 is connected to the input port si4, the output port d2 is connected to the input port si8, the output port d3 is connected to the input port si12, and the output port d4 is connected to the input port si16.

On the output side of the switching module 20 the output port so1 is connected to the input port e1, the output port so2 is connected to the input port f1, the output port so3 is connected to the input port g1, and the output port so4 is connected to the input port h1.

Furthermore, the output port so5 is connected to the input port e2, the output port so6 is connected to the input port f2, the output port so7 is connected to the input port g2, and the output port so8 is connected to the input port h2. Moreover, the output port so9 is connected to the input port e3, the output port so10 is connected to the input port f3, the output port so11 is connected to the input port g3, and the output port so12 is connected to the input port h3.

In addition, the output port so13 is connected to the input port e4, the output port so14 is connected to the input port f4, the output port so15 is connected to the input port g4, and the output port so16 is connected to the input port h4.

The operation of each component will be described. When the separation section 11a receives input data, the separation section 11a separates it into segments and outputs the segments from the output ports a1 through a4 (destination of each segment is determined). When the separation section 11b receives input data, the separation section 11b separates it into segments and outputs the segments from the output ports b1 through b4.

When the separation section 11c receives input data, the separation section 11c separates it into segments and outputs the segments from the output ports c1 through c4. When the separation section 11d receives input data, the separation section 11d separates it into segments and outputs the segments from the output ports d1 through d4.

The distribution section dis1 distributes segments received via the input ports si1 through si4 among the determined queues q1 through q4. The segments distributed are placed in the queues q1 through q4. The segments placed in the queues q1 through q4 are outputted via the output ports so1 through so4.

The distribution section dis2 distributes segments received via the input ports si5 through si8 among the determined queues q5 through q8. The segments distributed are placed in the queues q5 through q8. The segments placed in the queues q5 through q8 are outputted via the output ports so5 through so8.

The distribution section dis3 distributes segments received via the input ports si9 through si12 among the determined queues q9 through q12. The segments distributed are placed in the queues q9 through q12. The segments placed in the queues q9 through q12 are outputted via the output ports so9 through so12.

The distribution section dis4 distributes segments received via the input ports si13 through si16 among the determined queues q13 through q16. The segments distributed are placed in the queues q13 through q16. The segments placed in the queues q13 through q16 are outputted via the output ports so13 through so16.

When the multiplexing section 12e receives segments after switching via the input ports e1 through e4, the multiplexing section 12e multiplexes them and outputs them via a port #1. When the multiplexing section 12f receives segments after switching via the input ports f1 through f4, the multiplexing section 12f multiplexes them and outputs them via a port #2.

When the multiplexing section 12g receives segments after switching via the input ports g1 through g4, the multiplexing section 12g multiplexes them and outputs them via a port #3. When the multiplexing section 12h receives segments after switching via the input ports h1 through h4, the multiplexing section 12h multiplexes them and outputs them via a port #4.

Figure 3:
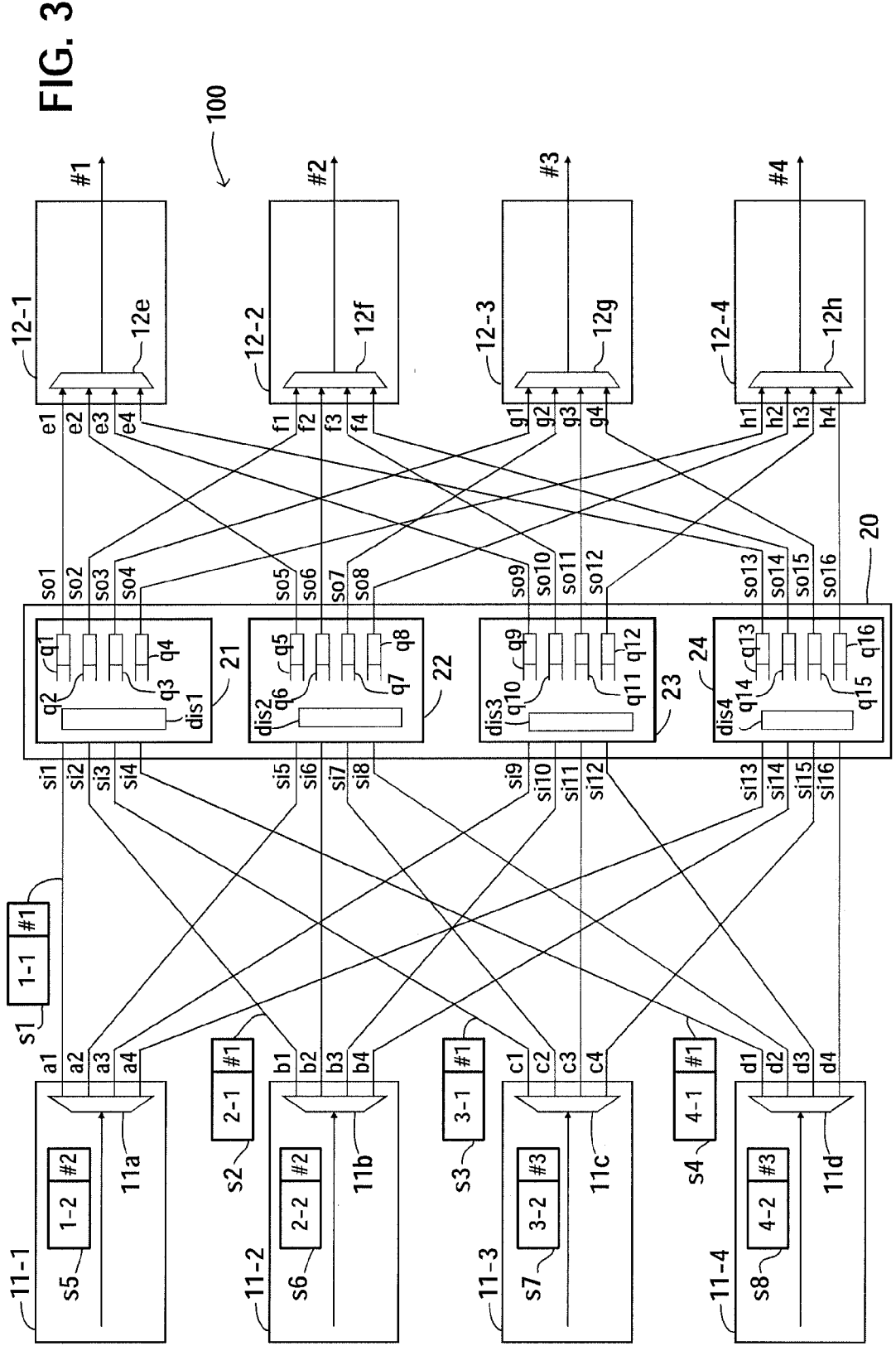
FIG. 3 illustrates the flow of segments.

A segment congestion state which arises at switching time will now be described with reference to FIGS. 3 through 10. FIG. 3 illustrates the flow of segments. FIG. 3 illustrates a state in which segments s1 through s4 are transmitted from the input cards 11-1 through 11-4 to the switching chip 21.

The segment s1 is outputted from the output port a1 of the separation section 11a included in the input card 11-1. The segment s2 is outputted from the output port b1 of the separation section 11b included in the input card 11-2.

In addition, the segment s3 is outputted from the output port c1 of the separation section 11c included in the input card 11-3. The segment s4 is outputted from the output port d1 of the separation section 11d included in the input card 11-4.

Figure 4:
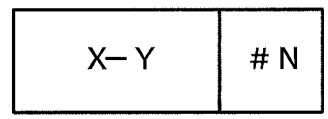
FIG. 4 is a view for describing segment representation.

It is assumed that all the destinations of the segments s1 through s4 are the port #1 (output card 12-1). For the sake of intelligibility a destination port number, a source card number, and a segment transmission number for each segment are indicated in FIG. 3 (FIG. 4 is a view for describing segment representation).

With the segment s2, for example, "#1" indicates a destination port number. "2" of "2-1" indicates a source card number and the input card 11-2 is a source card. "1" of "2-1" indicates a segment transmission number.

Figure 5:
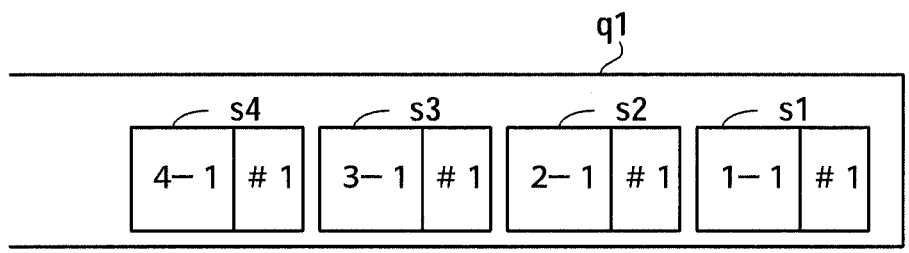
FIG. 5 illustrates a queuing state.

FIG. 5 illustrates a queuing state. FIG. 5 illustrates the queuing state of the queue q1 in the switching chip 21. The distribution section dis1 of the switching chip 21 receives the segments s1 through s4 via the input ports si1 through si4 respectively. The destinations of the segments s1 through s4 are the port #1, so the segments s1 through s4 are distributed to the queue q1. The segments s1 through s4 are placed in the queue q1.

Figure 6:
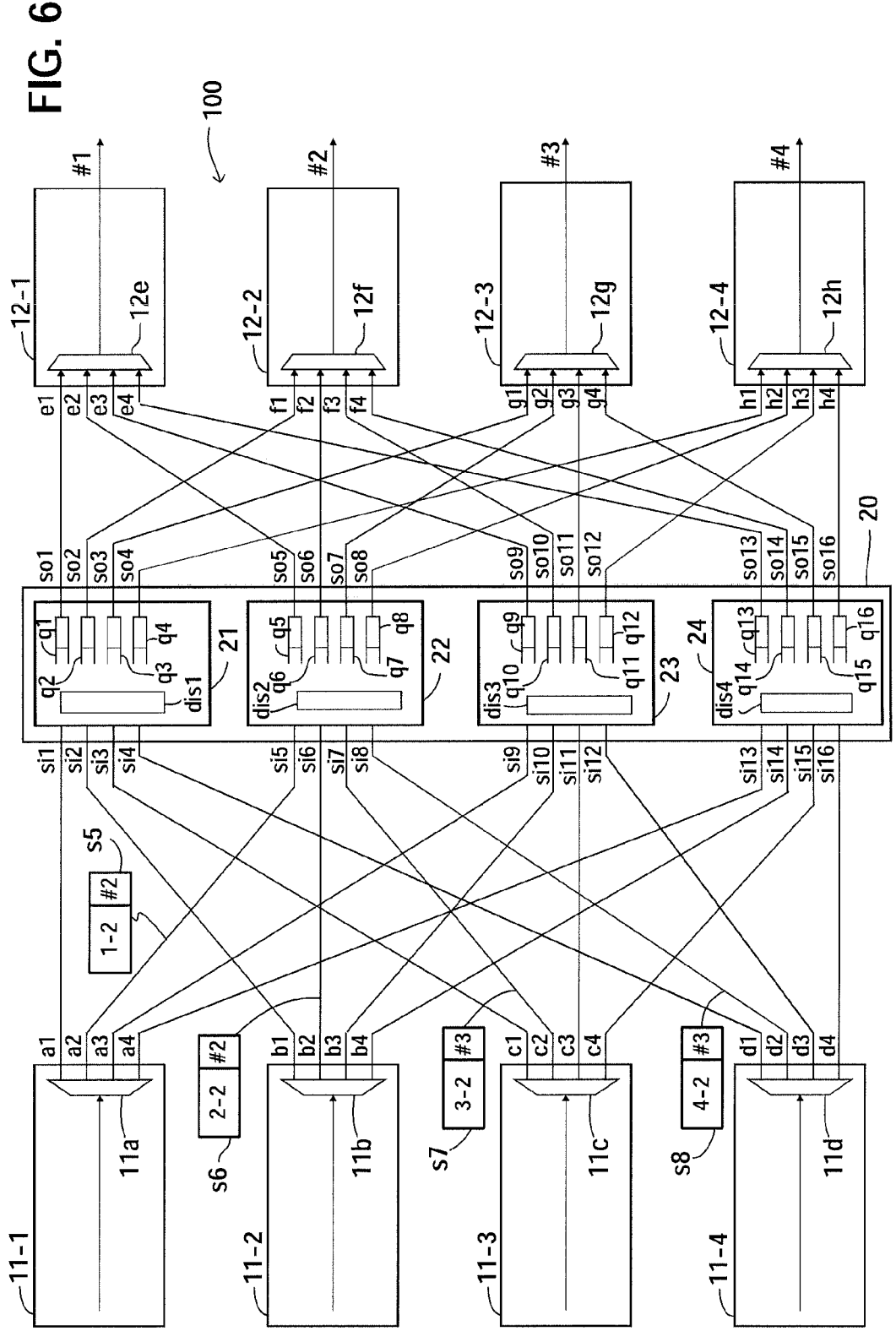
FIG. 6 illustrates the flow of segments.

FIG. 6 illustrates the flow of segments. FIG. 6 illustrates a state in which next segments are transmitted from the input cards 11-1 through 11-4 to the switching chip 22. Segments s5 through s8 are outputted from the input cards 11-1 through 11-4 respectively. It is assumed that the destinations of the segments s5 and s6 are the port #2 (output card 12-2) and that the destinations of the segments s7 and s8 are the port #3 (output card 12-3).

The segment s5 is outputted from the output port a2 of the separation section 11a included in the input card 11-1. The segment s6 is outputted from the output port b2 of the separation section 11b included in the input card 11-2.

The segment s7 is outputted from the output port c2 of the separation section 11c included in the input card 11-3. The segment s8 is outputted from the output port d2 of the separation section 11d included in the input card 11-4.

Figure 7:
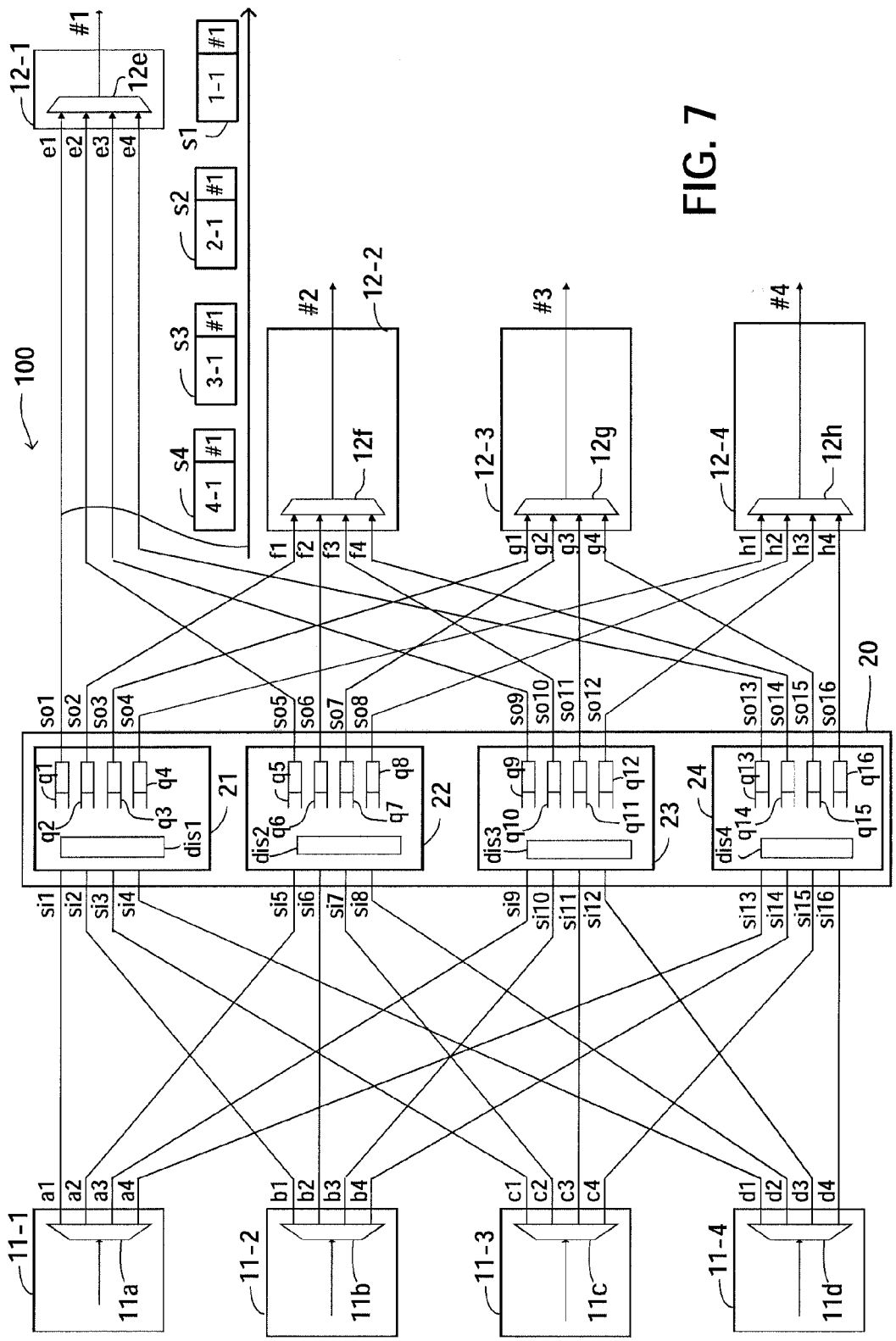
FIG. 7 illustrates the flow of the segments.

FIG. 7 illustrates the flow of the segments. FIG. 7 illustrates a state in which the segments s1 through s4 after being queued are transmitted from the switching chip 21 to the output card 12-1. The segments s1 through s4 are outputted in order from the queue q1 via the output ports so1.

FIG. 8 illustrates a queuing state. FIG. 8 illustrates the queuing state of the queues q6 and q7 in the switching chip 22. The distribution section dis2 of the switching chip 22 receives the segments s5 through s8 via the input ports si5 through si8 respectively.

The destinations of the segments s5 and s6 are the port #2, so the segments s5 and s6 are distributed to the queue q6. The segments s5 and s6 are placed in the queue q6.

The destinations of the segments s7 and s8 are the port #3, so the segments s7 and s8 are distributed to the queue q7. The segments s7 and s8 are placed in the queue q7.

Figure 9:
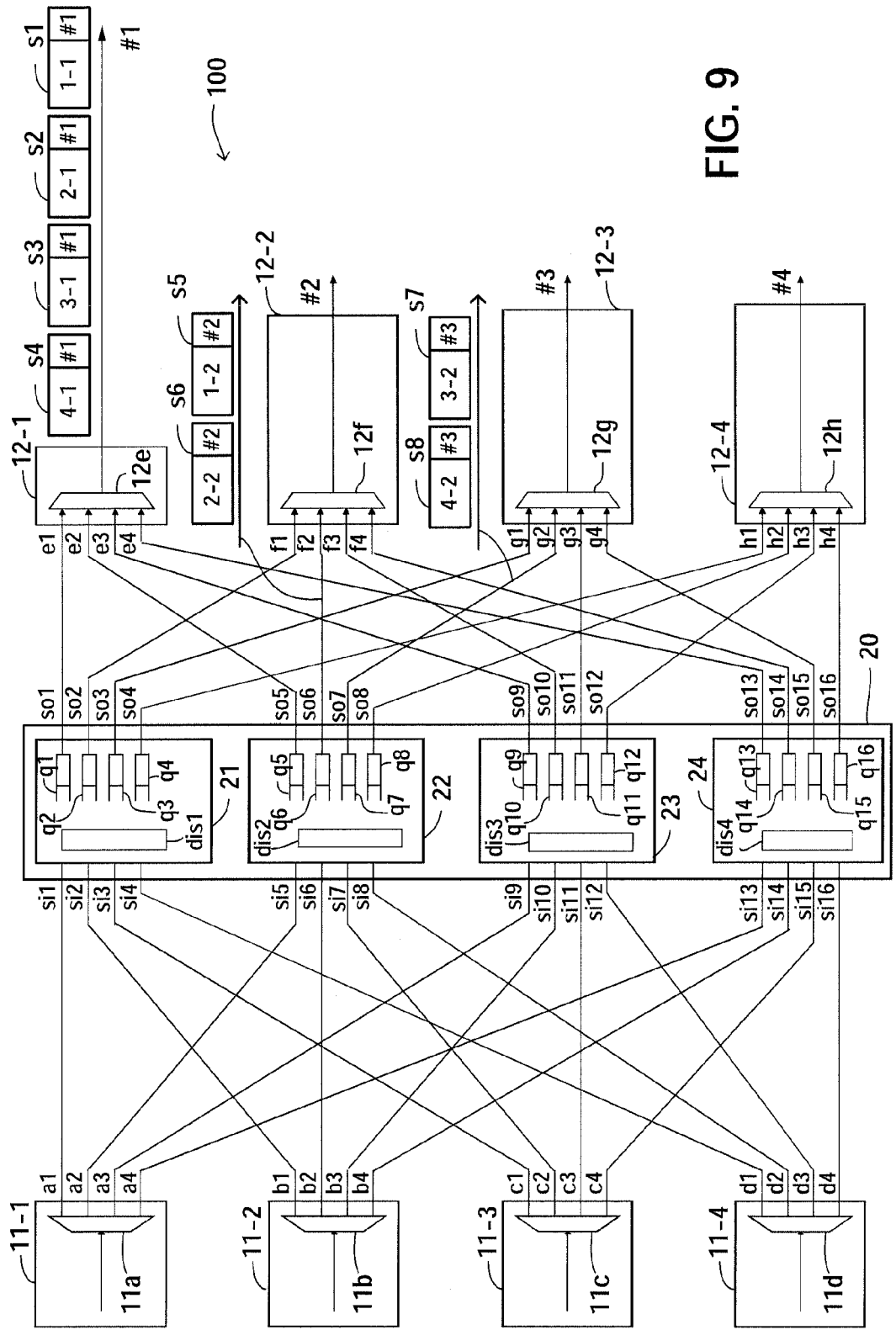
FIG. 9 illustrates the flow of the segments.

FIG. 9 illustrates the flow of the segments. FIG. 9 illustrates a state in which the segments s1 through s4 are outputted from the output card 12-1 and in which the segments s5 through s8 are outputted from the switching chip 22.

The output card 12-1 receives the segments s1 through s4 via the input port e1. The multiplexing section 12e multiplexes the segments s1 through s4 and outputs them via the port #1.

On the other hand, the segments s5 and s6 outputted from the queue q6 of the switching chip 22 are outputted via the output port so6. In addition, the segments s7 and s8 outputted from the queue q7 of the switching chip 22 are outputted via the output port so7.

Figure 10:
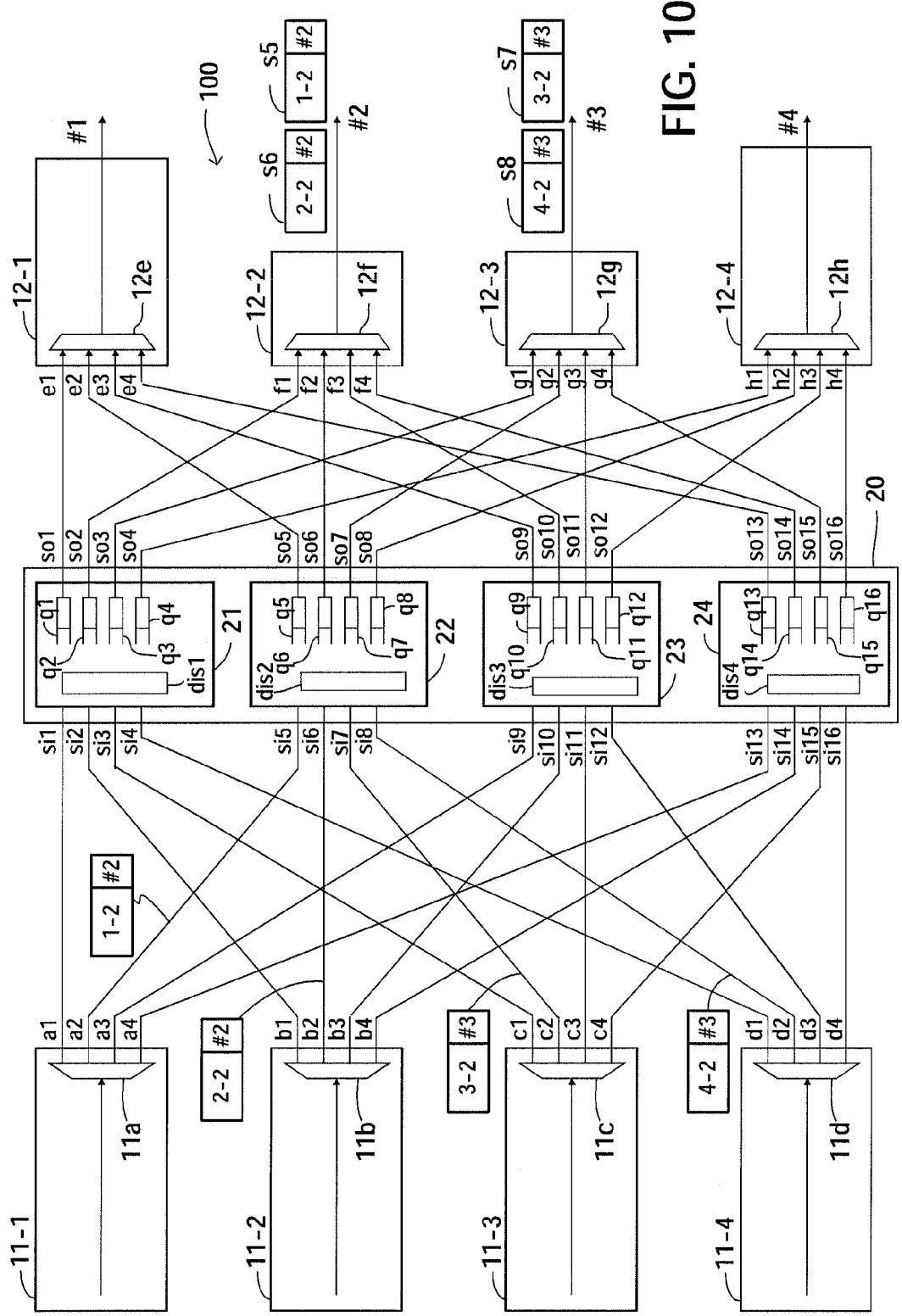
FIG. 10 illustrates the flow of the segments.

FIG. 10 illustrates the flow of the segments. FIG. 10 illustrates a state in which the segments s5 and s6 are outputted from the output card 12-2 and in which the segments s7 and s8 are outputted from the output card 12-3.

The output card 12-2 receives the segments s5 and s6 via the input port f2. The multiplexing section 12f multiplexes the segments s5 and s6 and outputs them via the port #2. The output card 12-3 receives the segments s7 and s8 via the input port g2. The multiplexing section 12g multiplexes the segments s7 and s8 and outputs them via the port #3.

In a state in which the above segments are switched, the segments s1 through s4 the destinations of which are the port #1 reach the switching chip 21 and are outputted. The destinations of the four segments s1 through s4 are the same, so congestion occurs in the switching chip 21. As a result, a delay occurs due to output queuing and transmission quality deteriorates.

An approximate band used for communication between a card and the switching module can be found by (capacity of card)/(number of switching chips). For example, if the capacity of a card is 10 Gbps and the number of switching chips is 4, then a band used is 2.5 Gbps.

Accordingly, by securing a band corresponding to the capacity of an output card for communication between the output card and the switching module, a delay due to queuing decreases even if congestion occurs in a switching chip. However, this method leads to an increase in costs and is disadvantageous from the viewpoint of mounting. Therefore, this method is not realistic.

With the conventional switching device 100, the following problem arises. When a plurality of segments transmitted to the same destination concentrate at switching time, segment congestion which significantly deteriorates transmission quality may occur. Accordingly, though the other switching chips are free, a delay due to queuing occurs in a switching chip. This leads to a delay in the entire device.

In consideration of the above situation, an object of the present embodiment is to improve transmission quality by reducing segment congestion at switching time and controlling a transmission delay.

Figure 11:
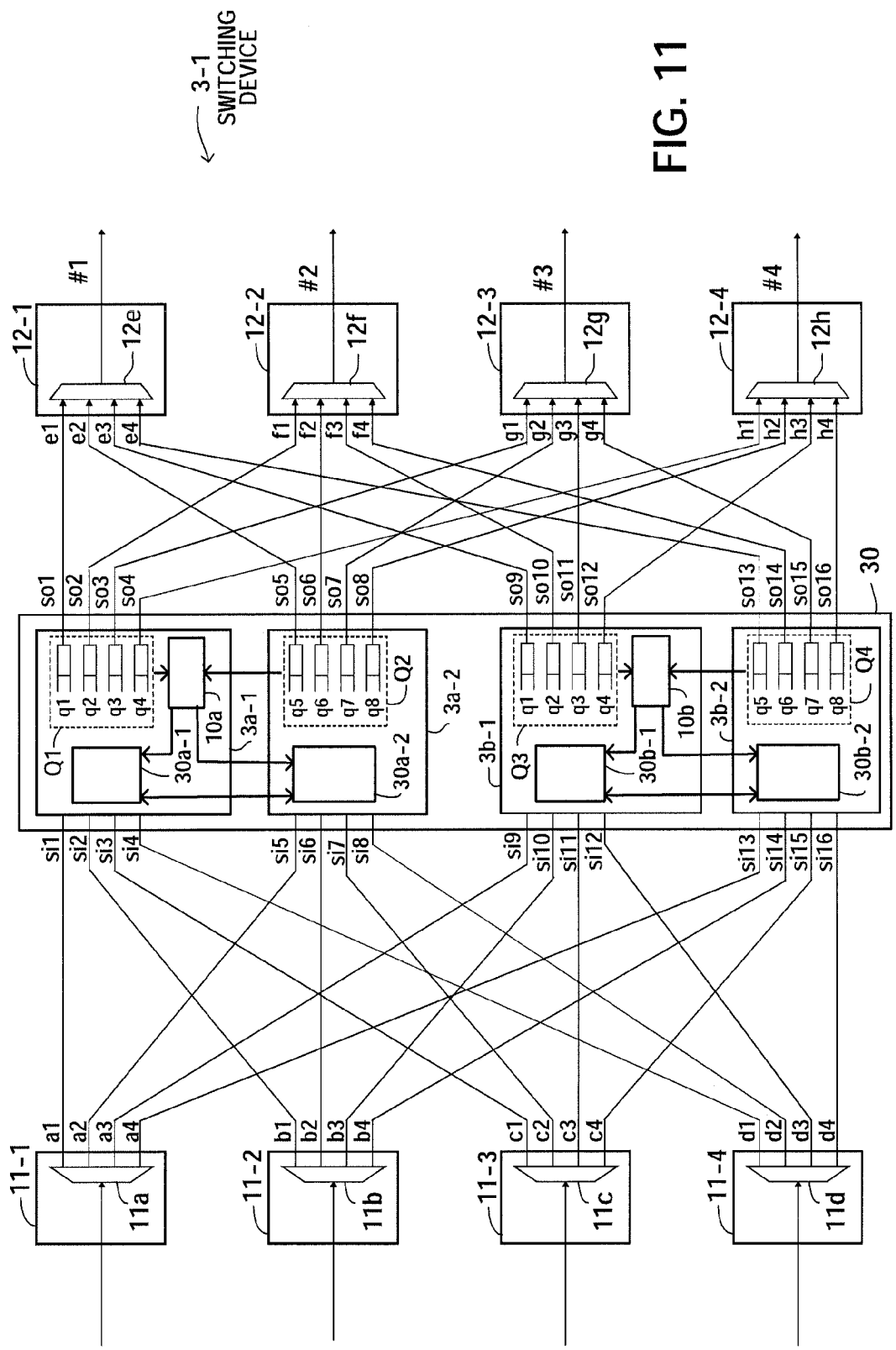
FIG. 11 illustrates an example of the structure of a switching device.

The switching device 3 will now be described. FIG. 11 illustrates an example of the structure of a switching device. A switching device 3-1 includes input cards 11-1 through 11-4 each of which performs a process at an input-side interface, a switching module (including the function of the switching device 3 illustrated in FIG. 1) 30, and output cards 12-1 through 12-4 each of which performs a process at an output-side interface. The switching device 3-1 differs from the switching device 100 illustrated in FIG. 2 in the structure of the switching module. The switching device 3-1 and the switching device 100 are equal in input card, output card, and port connection. Accordingly, the same components will be marked with the same symbols and only the differences will be described.

The switching module 30 includes switching chips 3a-1 and 3a-2 and switching chips 3b-1 and 3b-2. The switching chips 3a-1 and 3a-2 are connected to each other. The switching chips 3b-1 and 3b-2 are connected to each other. The switching chips 3a-1 and 3b-1 correspond to the switching section 3a-1 illustrated in FIG. 1. The switching chips 3a-2 and 3b-2 correspond to the switching section 3a-2 illustrated in FIG. 1.

The switching chip 3a-1 includes a switching processor 30a-1, a controller 10a, and an output-side FiFo Q1. The switching chip 3a-2 includes a switching processor 30a-2 and an output-side FiFo Q2.

The switching chip 3b-1 includes a switching processor 30b-1, a controller 10b, and an output-side FiFo Q3. The switching chip 3b-2 includes a switching processor 30b-2 and an output-side FiFo Q4. The output-side FiFo Q1 and the output-side FiFo Q3 correspond to a first storage unit and the output-side FiFo Q2 and the output-side FiFo Q4 correspond to a second storage unit.

Figure 12:
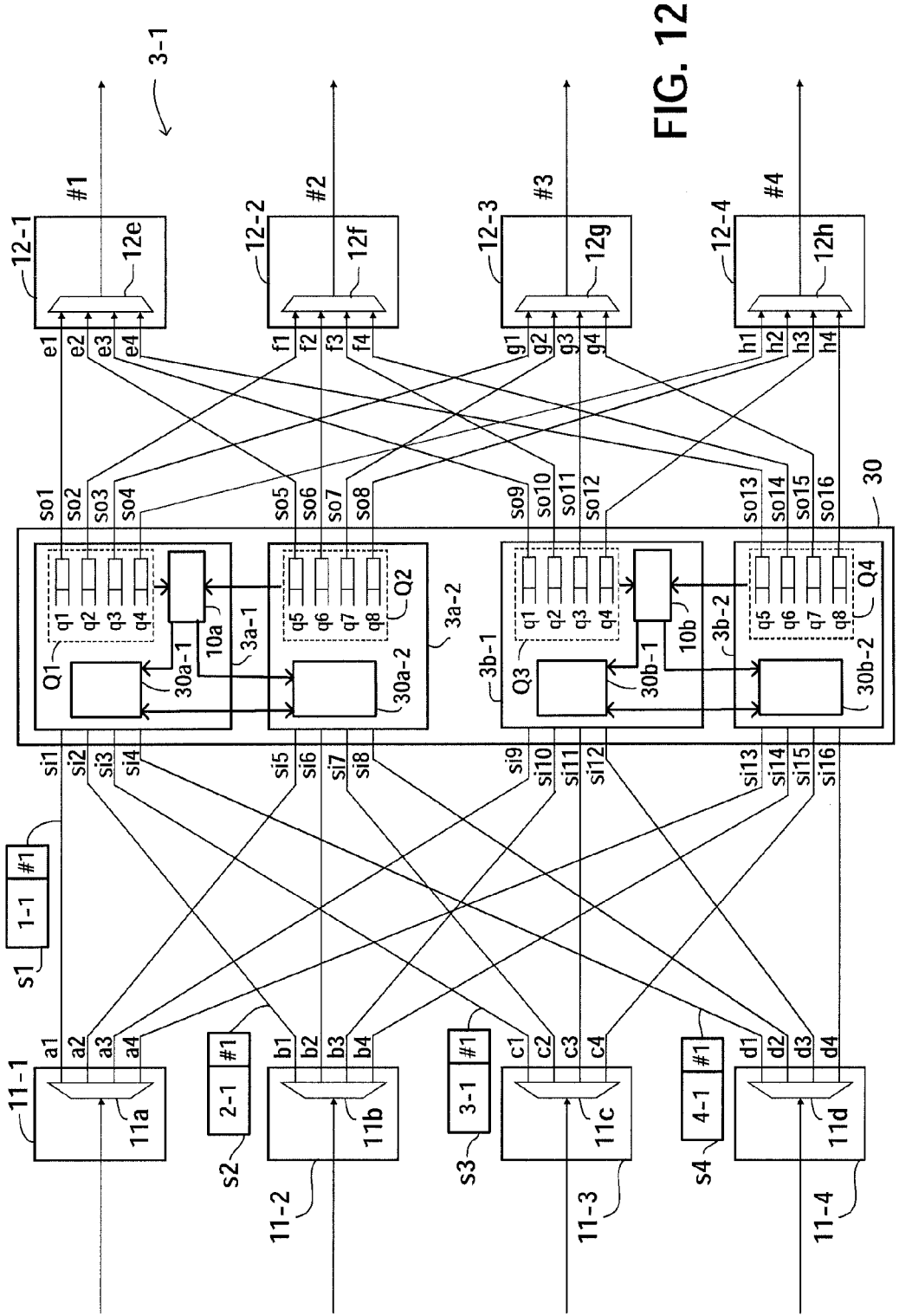
FIG. 12 illustrates the flow of segments.

The operation of the switching device 3-1 will now be described. FIG. 12 illustrates the flow of segments. FIG. 12 illustrates a state in which segments s1 through s4 are transmitted from the input cards 11-1 through 11-4 to the switching chip 3a-1.

The segments s1 through s4 are outputted from the input cards 11-1 through 11-4 respectively. It is assumed that all the destinations of the segments s1 through s4 are a port #1 (output card 12-1).

A separation section 11a included in the input card 11-1 outputs the segment s1 from an output port a1. A separation section 11b included in the input card 11-2 outputs the segment s2 from an output port b1.

In addition, a separation section 11c included in the input card 11-3 outputs the segment s3 from an output port c1. A separation section 11d included in the input card 11-4 outputs the segment s4 from an output port d1.

Figure 13:
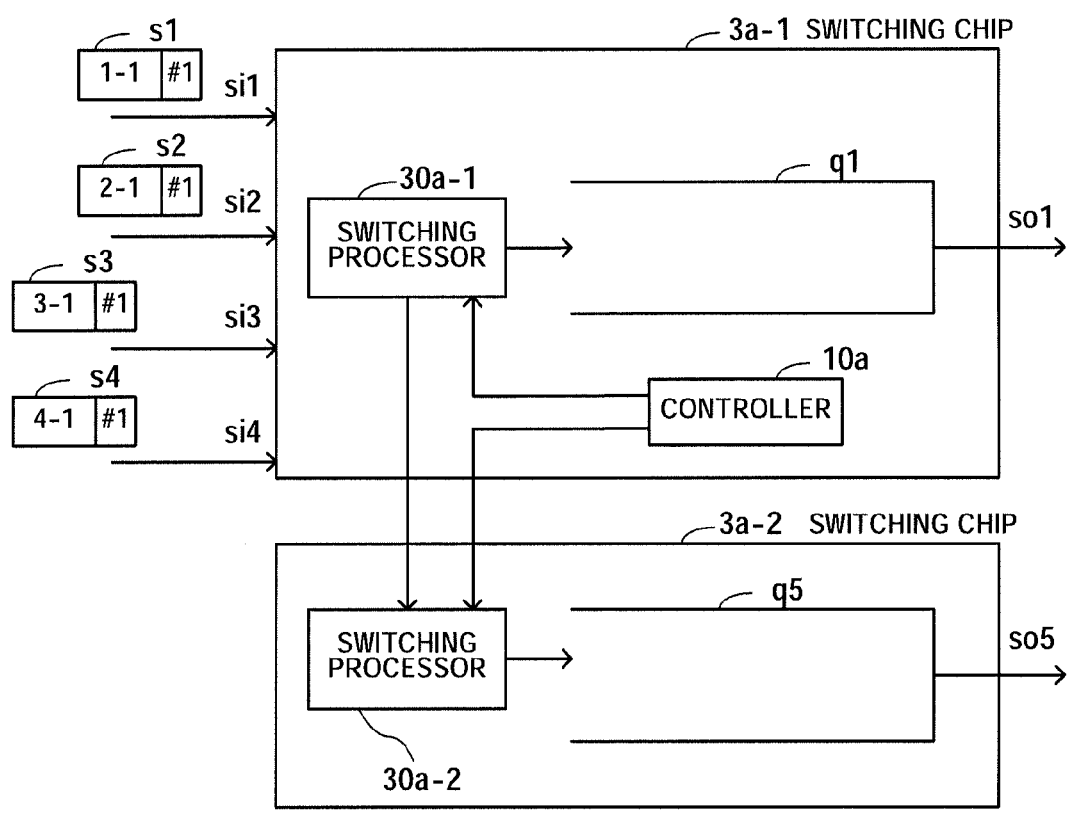
FIG. 13 is a view for describing a state in which the segments are bypass-transmitted.
Figure 14:
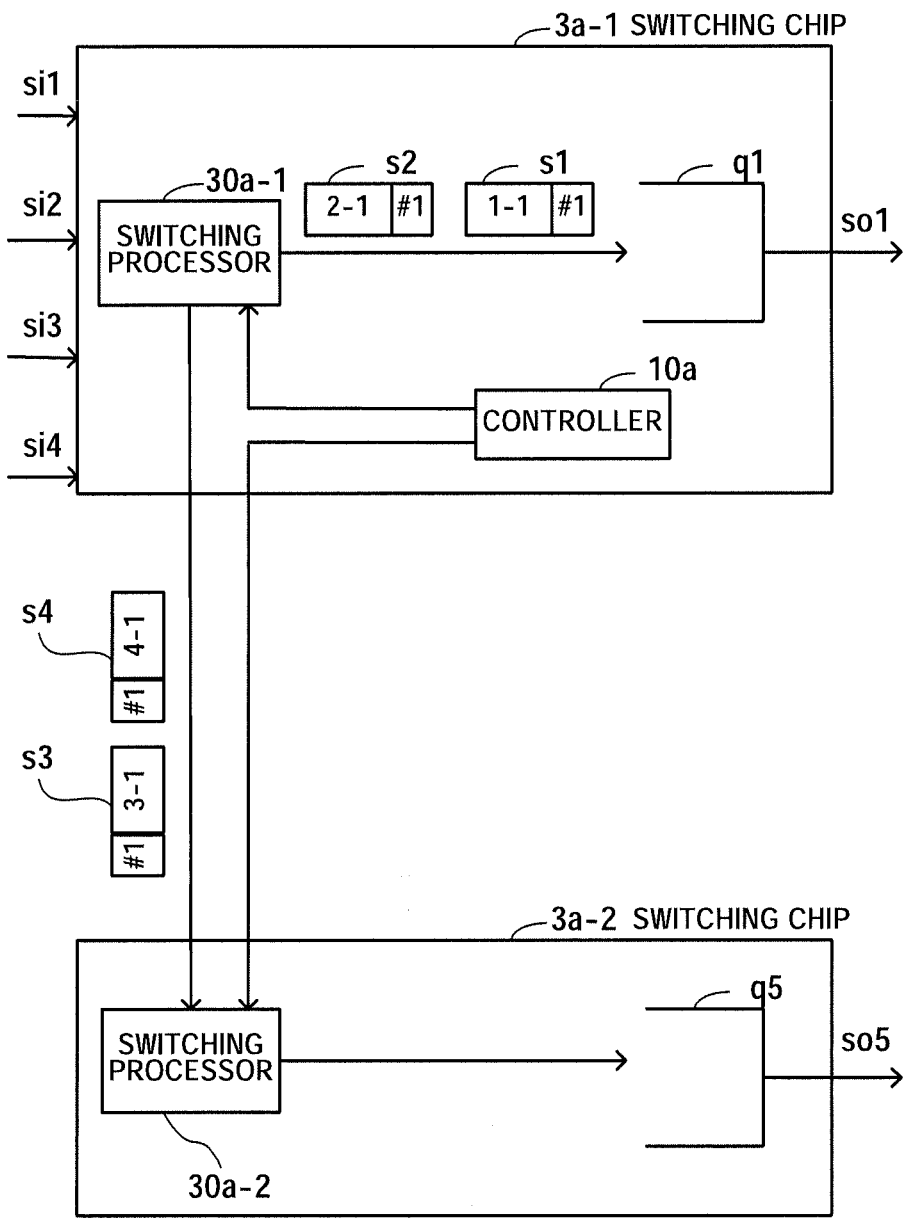
FIG. 14 is a view for describing a state in which the segments are bypass-transmitted.
Figure 15:
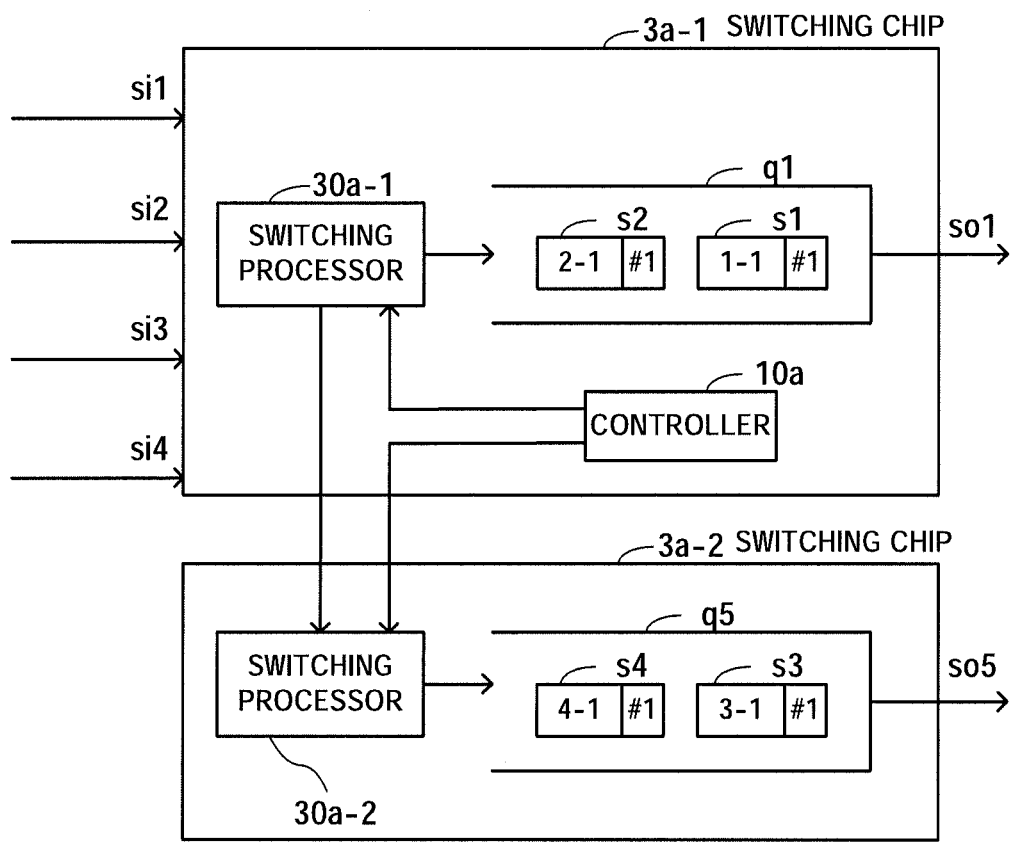
FIG. 15 is a view for describing a state in which the segments are bypass-transmitted.

FIG. 13 through 15 are views for describing a state in which the segments are bypass-transmitted. In FIG. 13, the segments s1 through s4 reach input ports si1 through si4, respectively, of the switching chip 3a-1. It is assumed that the segments s1 and s2 reach the switching chip 3a-1 before the segments s3 and s4.

In FIG. 14, the controller 10a recognizes that all the destinations of the segments s1 through s4 are the port #1. The controller 10a then gives the switching processors 30a-1 and 30a-2 distribution instructions so that the segments s1 and s2 which reach the switching chip 3a-1 before the segments s3 and s4 will be placed in a queue q1 included in the switching chip 3a-1 and so that the segments s3 and s4 which reach the switching chip 3a-1 after the segments s1 and s2 will be placed in a queue q5 included in the switching chip 3a-2.

In accordance with the distribution instructions from the controller 10a the switching processor 30a-1 transmits the segments s1 and s2 to the queue q1 and transmits the segments s3 and s4 to the switching processor 30a-2.

In FIG. 15, the segments s1 and s2 transmitted from the switching processor 30a-1 are placed in the queue q1. Furthermore, the segments s3 and s4 transmitted from the switching processor 30a-2 are placed in the queue q5.

Figure 16:
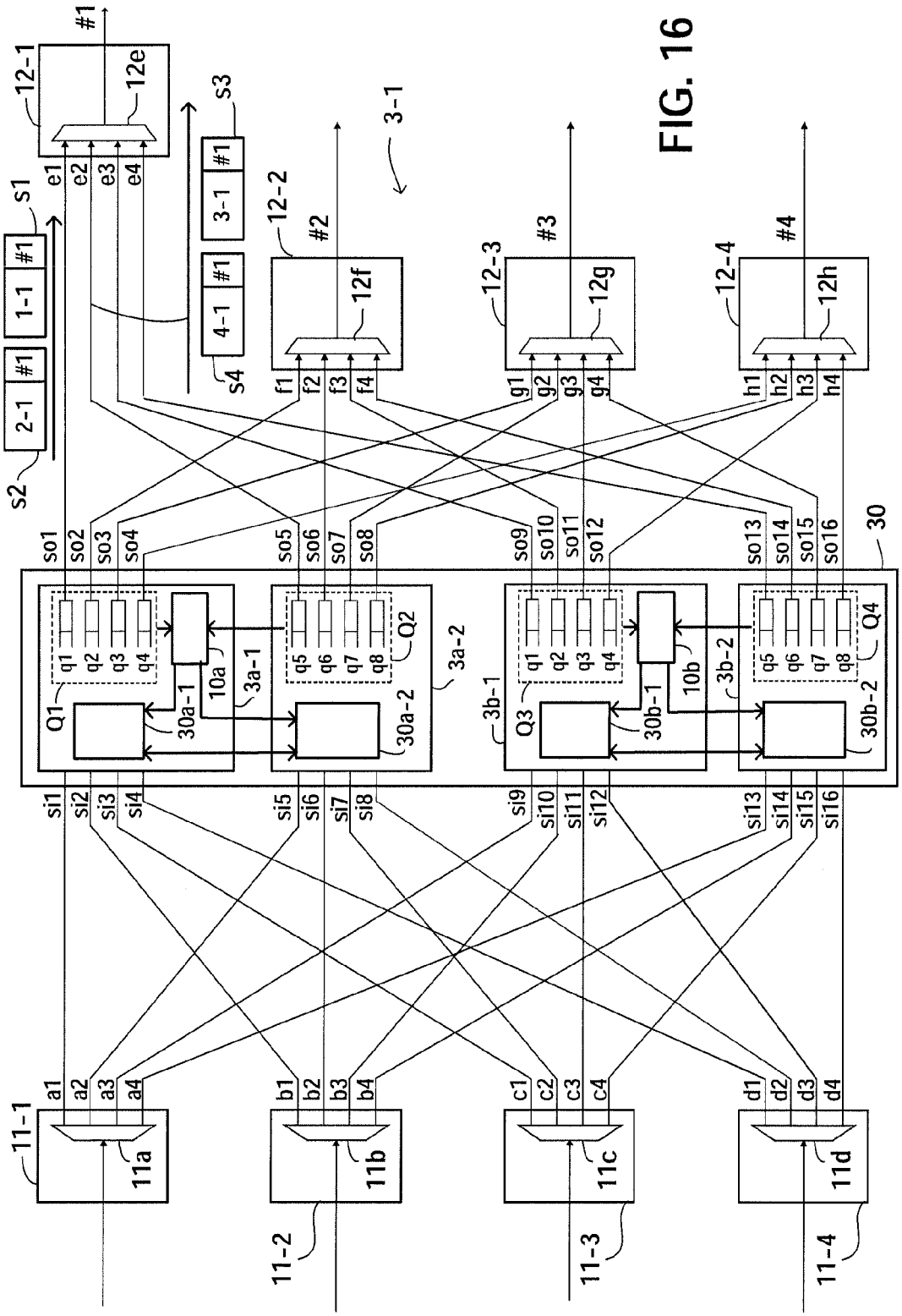
FIG. 16 illustrates the flow of the segments.

FIG. 16 illustrates the flow of the segments. FIG. 16 illustrates a state in which the segments s1 and s2 after being queued are transmitted from the switching chip 3a-1 to the output card 12-1 and in which the segments s3 and s4 after being queued are transmitted from the switching chip 3a-2 to the output card 12-1.

The segments s1 and s2 are outputted via an output ports so1 of the switching chip 3a-1. The segments s3 and s4 are outputted via an output ports so5 of the switching chip 3a-2.

Figure 17:
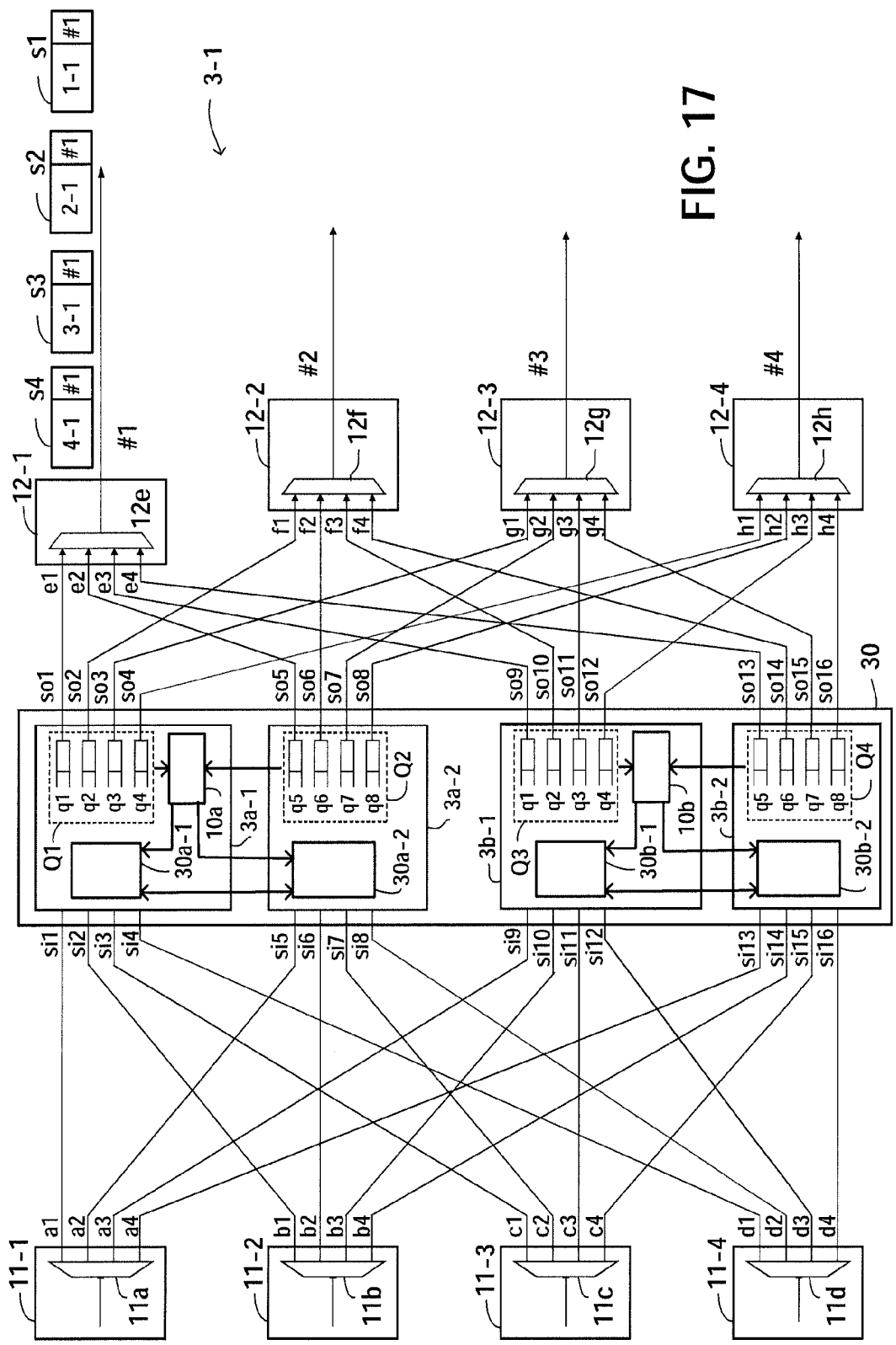
FIG. 17 illustrates the flow of the segments.

FIG. 17 illustrates the flow of the segments. FIG. 17 illustrates a state in which the segments s1 through s4 are outputted from the output card 12-1. The output card 12-1 receives the segments s1 and s2 via an input port e1 and receives the segments s3 and s4 via an input port e2. A multiplexing section 12e multiplexes the segments s1 through s4 and outputs them via the port #1.

Of the segments s1 through s4 concentrated at the switching chip 3a-1, as has been described, the segments s1 and s2 are switched by the switching chip 3a-1. The segments s3 and s4 are bypass-transmitted to the switching chip 3a-2 and are switched by the switching chip 3a-2. By doing so, a congestion state caused by the segments s1 through s4 concentrated at the switching chip 3a-1 can be eased and a transmission delay can be controlled.

Figure 18:
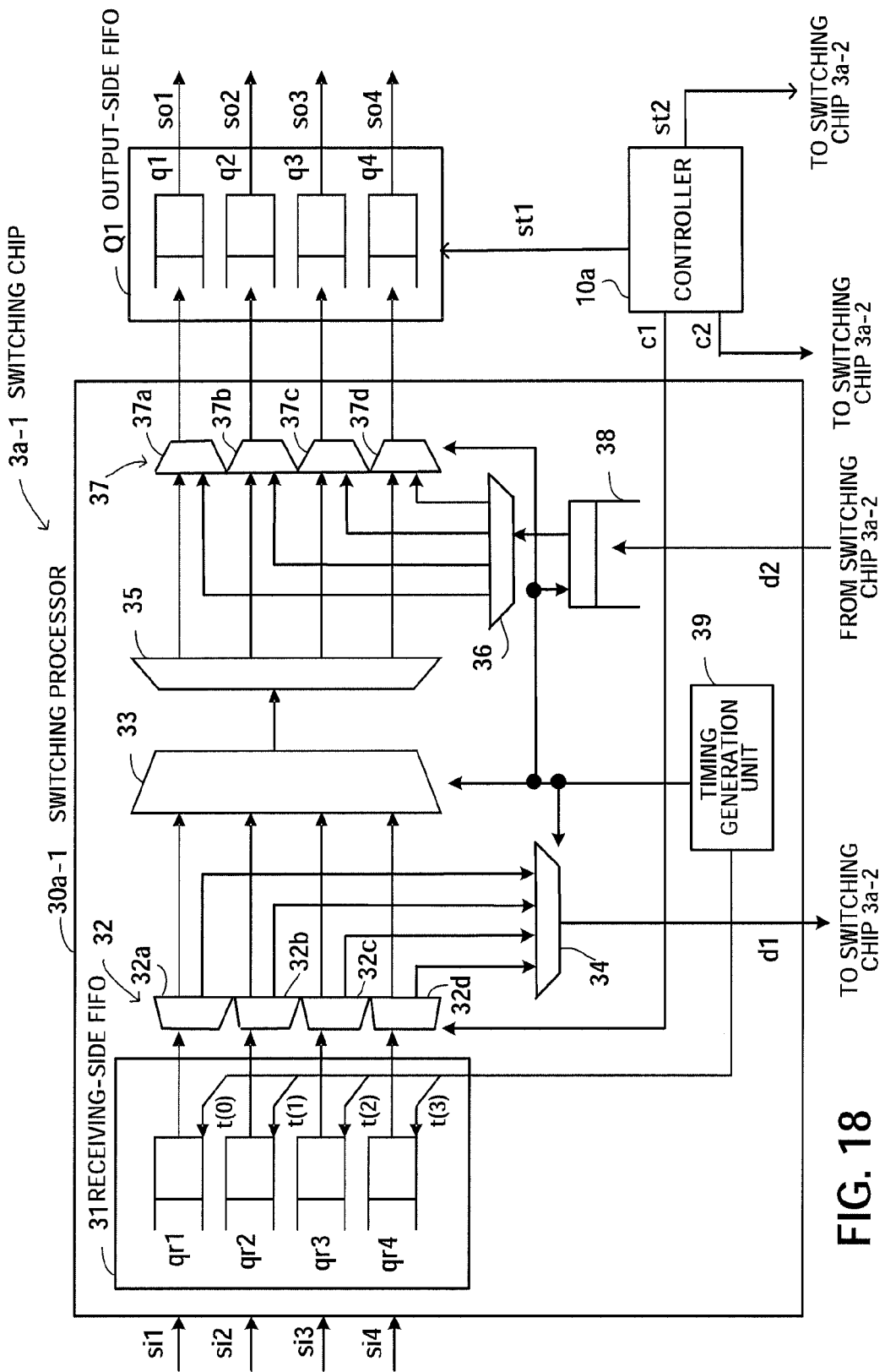
FIG. 18 illustrates an example of the internal structure of a switching chip.

The structure of the switching chip 3a-1 will now be described (switching chip 3a-2 does not include a controller, but its basic structure is the same as that of the switching chip 3a-1). FIG. 18 illustrates an example of the internal structure of the switching chip 3a-1. The switching chip 3a-1 includes the switching processor 30a-1, the controller 10a, and the output-side FiFo Q1.

The switching processor 30a-1 includes a receiving-side FiFo 31, a distribution unit 32, multiplexing units 33 and 34, distribution units 35 and 36, a multiplexing unit 37, a Wait FiFo 38, and a timing generation unit 39. The receiving-side FiFo 31 includes queues qr1 through qr4. The distribution unit 32 includes DISes (distributors) 32a through 32d. The multiplexing unit 37 includes MUX 37a through 37d.

A segment received via the input ports si1 is placed in the queue qr1. After that, the segment is outputted to the DIS 32a on the basis of a timing signal. A segment received via the input ports si2 is placed in the queue qr2. After that, the segment is outputted to the DIS 32b on the basis of a timing signal.

A segment received via the input ports si3 is placed in the queue qr3. After that, the segment is outputted to the DIS 32c on the basis of a timing signal. A segment received via the input ports si4 is placed in the queue qr4. After that, the segment is outputted to the DIS 32d on the basis of a timing signal.

In accordance with instructions transmitted from the controller 10a to distribute the segments to the output-side FiFo Q1 in the switching chip 3a-1 or the switching chip 3a-2, the DISes 32a through 32d included in the distribution unit 32 distribute the received segments to the multiplexing unit 33 or 34.

The multiplexing unit 34 multiplexes segments the destinations of which are the switching chip 3a-2 on the basis of a timing signal. A multiplexed data signal d1 is transmitted to the switching chip 3a-2. The data signal d1 is transmitted to a Wait FiFo included in the switching chip 3a-2.

On the basis of a timing signal, the multiplexing unit 33 multiplexes segments the destinations of which are the output-side FiFo Q1 in the switching chip 3a-1, and transmits a signal obtained to the distribution unit 35. The distribution unit 35 selects a queue q1, q2, q3, or q4 according to the destinations of the segments and distributes the segments to the MUXes 37a through 37d to output them to the selected queues.

The Wait FiFo 38 queues a data signal d2 transmitted (bypass-transmitted) from the switching chip 3a-2 and outputs it to the distribution unit 36 on the basis of a timing signal.

The distribution unit 36 selects the queue q1, q2, q3, or q4 according to the destinations of segments and distributes the received data signal d2 to the MUXes 37a through 37d according to segment to output them to the selected queues. The MUXes 37a through 37d receive the segments outputted from the distribution unit 35 and the segments which are outputted from the distribution unit 36 and which are transmitted from the switching chip 3a-2, and multiplex and output them on the basis of a timing signal.

A segment transmitted from the MUX 37a is placed in the queue q1. After that, the segment is outputted via the output ports so1. A segment transmitted from the MUX 37b is placed in the queue q2. After that, the segment is outputted via an output ports so2.

A segment transmitted from the MUX 37c is placed in the queue q3. After that, the segment is outputted via an output ports so3. A segment transmitted from the MUX 37d is placed in the queue q4. After that, the segment is outputted via an output ports so4.

In addition, each of the queues q1 through q4 informs the controller 10a of its queuing state (capacity). The controller 10a monitors the capacity of the queues q1 through q4 of the switching chip 3a-1 via a monitoring line st1 and monitors the capacity of the queues q5 through q8 of the switching chip 3a-2 via a monitoring line st2. When congestion (conflict) occurs in one switching chip, the controller 10a exercises control for bypass-transmitting segments to the other switching chip.

According to the congestion state of the queues q1 through q4 of the switching chip 3a-1, the controller 10a gives the distribution unit 32 bypass-transmission instructions c1. Alternatively, according to the congestion state of the queues q5 through q8 of the switching chip 3a-2, the controller 10a gives the switching chip 3a-2 bypass-transmission instructions c2.

The concrete operation of the controller 10a will be described. It is assumed that there is a large amount of data the destination of which is the port #1 and that a state in which congestion occurs in the switching processor 30a-1 of the switching chip 3a-1 arises.

The controller 10a determines whether the capacity of the queue q1 that stores plural pieces of data the destinations of which are the port #1 is greater than or equal to a threshold or not. In addition, the controller 10a determines whether the current capacity of the queue q5 that stores bypass-transmitted pieces of data the destinations of which are the port #1 is smaller than a threshold.

It is assumed that the capacity of the queue q1 that stores the plural pieces of data the destinations of which are the port #1 is greater than or equal to the threshold and that the current capacity of the queue q5 that stores the bypass-transmitted pieces of data the destinations of which are the port #1 is smaller than the threshold.

In this case, a determined number of pieces of data the destinations of which are the port #1 are bypass-transmitted from the switching processor 30a-1 of the switching chip 3a-1 to the switching processor 30a-2 of the switching chip 3a-2.

In this example, bypass-transmitting the determined number of pieces of data means bypass-transmitting pieces of data which do not exceed the threshold of the capacity of the queue q5 from the switching processor 30a-1 to the switching processor 30a-2. This reduces the capacity of the queue q1.

A part of data which exceeds the threshold of the capacity of the queue q1 is bypass-transmitted in this way to the switching chip 3a-2 to make both of the switching processor 30a-1 and the switching processor 30a-2 perform a switching process. This can ease the congestion state of the switching processor 30a-1.

In addition, it is assumed that when a switching process is being performed by bypass-transmission, the capacity of the queue q1 becomes smaller than the threshold. In this case, the bypass-transmission is stopped and a switching process is performed only by the switching chip 3a-1 (it is possible to set two thresholds, that is to say, a threshold (upper-limit threshold) for performing bypass-transmission and a threshold (lower-limit threshold) for stopping bypass-transmission and exercise control).

If the capacity of each of the queues q1 and q5 that store plural pieces of data the destinations of which are the port #1 is greater than or equal to the threshold, then bypass-transmission from the switching processor 30a-1 to the switching processor 30a-2 is not performed.

Conversely, on the other hand, it is assumed that there is a large amount of data the destination of which is the port #1 and that a state in which congestion occurs in the switching processor 30a-2 of the switching chip 3a-2 arises.

The controller 10a determines whether the capacity of the queue q5 that stores plural pieces of data the destinations of which are the port #1 is greater than or equal to the threshold or not. In addition, the controller 10a determines whether the current capacity of the queue q1 that stores bypass-transmitted pieces of data the destinations of which are the port #1 is smaller than the threshold.

It is assumed that the capacity of the queue q5 that stores the plural pieces of data the destinations of which are the port #1 is greater than or equal to the threshold and that the current capacity of the queue q1 that stores the bypass-transmitted pieces of data the destination of which are the port #1 is smaller than the threshold.

In this case, a determined number of pieces of data the destinations of which are the port #1 are bypass-transmitted from the switching processor 30a-2 of the switching chip 3a-2 to the switching processor 30a-1 of the switching chip 3a-1.

In this example, bypass-transmitting the determined number of pieces of data means bypass-transmitting pieces of data which do not exceed the threshold of the capacity of the queue q1 from the switching processor 30a-2 to the switching processor 30a-1.

A part of data which exceeds the threshold of the capacity of the queue q5 is bypass-transmitted in this way to the switching chip 3a-1 to make both of the switching processor 30a-1 and the switching processor 30a-2 perform a switching process. This can ease the congestion state of the switching processor 30a-2.

In addition, it is assumed that when a switching process is being performed by bypass-transmission, the capacity of the queue q5 becomes smaller than the threshold. In this case, the bypass-transmission is stopped and a switching process is performed only by the switching chip 3a-2. If the capacity of each of the queues q1 and q5 that store plural pieces of data the destinations of which are the port #1 is greater than or equal to the threshold, then bypass-transmission from the switching processor 30a-2 to the switching processor 30a-1 is not performed.

Whether to perform bypass-transmission is determined in the above way with a threshold of the capacity of a queue as reference. By doing so, bypass-transmission which flexibly accommodates a data congestion state can be performed efficiently. As a concrete example, it is assumed that the maximum congestion count of switched segments is 4. When queue capacity in the switching chip 3a-1 becomes greater than or equal to 2, the controller 10a gives the distribution unit 32 of the switching chip 3a-1 instructions to bypass-transmit a segment to the switching chip 3a-2.

When the queue capacity becomes smaller than or equal to 1, the bypass-transmission is stopped. By exercising such control, a congestion count in the switching chip 3a-1 can be reduced from 4, which is the maximum value, to 2, which is half of the maximum value.

FIG. 19 is a time chart of operation. Timing signals t(0) through t(3) indicated in FIG. 18 are transmitted to the queues qr1 through qr4 respectively. When the timing signals t(0) through t(3) are at a H level, data is read out from the queues qr1 through qr4 respectively. In the case of FIG. 19, segments s1, s2, s3, and s4 are read out in that order.

When the segments s1 and s2 are placed in the queue qr1, the controller 10a is informed that two segments are placed in the queue. The controller 10a gives the DISes 32c and 32d instructions to bypass-transmit the segments s3 and s4, respectively, to the switching chip 3a-2. The DISes 32c and 32d transmit the segments s3 and s4, respectively, to the switching chip 3a-2.

As has been described in the foregoing, if congestion may occur at the time of switching pieces of data the destinations of which are the same by one switching processor, then a determined number of pieces of data are bypass-transmitted to the other switching processor and both of the switching processors perform a switching process. As a result, data congestion at switching time can be reduced and a transmission delay can be controlled.

In addition, congestion determination is made by the use of a threshold which is half of a maximum congestion count, and bypass-transmission control is exercised. By doing so, a congestion count in a switching chip can be reduced to about half of the maximum congestion count. For example, if the total number of input cards and output cards is 16, congestion may be caused by a maximum of 16 segments. However, when congestion is caused by eight or more segments in one switching chip, a segment is bypass-transmitted to the other switching chip. By doing so, a congestion count can be reduced to half of sixteen.

In the above description the switching chips 3a-1 and 3a-2 are paired and the controller 10a is placed in the switching chip 3a-1. That is to say, a controller is placed in one of two switching chips paired. However, line capacity is increasing, so switching control may be exercised by placing controllers in both switching chips. By doing so, a control line from a controller in one switching chip to the other switching chip can be eliminated. Furthermore, a load on each controller can be reduced.

Moreover, in the above description the controller monitors the capacity of each queue in the output-side FiFo. However, if the capacity of each queue in the output-side FiFo reaches a certain value, the output-side FiFo may autonomously inform the controller of it. As a result, even if the number of queues increases, a load on the controller can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that various changes, substitutions, and alterations could be made hereto without departing from the spirit and scope of the invention.

What is claimed is:

1. A switching device comprising:
a first switching section including:
a first switching processor which switches plural pieces of data to determined destinations; and
a controller which controls a switching process; and
a second switching section including a second switching processor which switches plural pieces of data to determined destinations, wherein:
the controller bypass-transmits a determined number of pieces of data received by the first switching processor to the second switching processor according to a congestion state of the first switching processor to make both of the first switching processor and the second switching processor perform a switching process;
the controller bypass-transmits a determined number of pieces of data received by the second switching processor to the first switching processor according to a congestion state of the second switching processor to make both of the first switching processor and the second switching processor perform a switching process; and
the first switching section and the second switching section are paired, and the controller is placed in one of two switching sections paired.

2. The switching device according to claim 1, wherein:
the first switching section further includes a plurality of first storage units which store the plural pieces of data according to destination;
the second switching section further includes a plurality of second storage units which store the plural pieces of data according to destination;
when capacity of a first storage unit that stores plural pieces of data destinations of which are the same is greater than or equal to a threshold and capacity of a second storage unit that stores bypass-transmitted pieces of data the destinations of which are the same is smaller than a threshold, the controller performs bypass-transmission from the first switching processor to the second switching processor;
when the capacity of the first storage unit that stores the plural pieces of data the destinations of which are the same is greater than or equal to the threshold and the capacity of the second storage unit that stores the bypass-transmitted pieces of data the destinations of which are the same is greater than or equal to the threshold, the controller does not perform bypass-transmission from the first switching processor to the second switching processor;
when capacity of a second storage unit that stores plural pieces of data destinations of which are the same is greater than or equal to a threshold and capacity of a first storage unit that stores bypass-transmitted pieces of data the destinations of which are the same is smaller than a threshold, the controller performs bypass-transmission from the second switching processor to the first switching processor; and
when the capacity of the second storage unit that stores the plural pieces of data the destinations of which are the same is greater than or equal to the threshold and the capacity of the first storage unit that stores the bypass-transmitted pieces of data the destinations of which are the same is greater than or equal to the threshold, the controller does not perform bypass-transmission from the second switching processor to the first switching processor.

3. A switching method comprising:

providing a first switching section including a first switching processor which switches plural pieces of data to determined destinations and a second switching section including a second switching processor which switches plural pieces of data to determined destinations;

bypass-transmitting a determined number of pieces of data received by the first switching processor to the second switching processor according to a congestion state of the first switching processor to make both of the first switching processor and the second switching processor perform a switching process; and bypass-transmitting a determined number of pieces of data received by the second switching processor to the first switching processor according to a congestion state of the second switching processor to make both of the first switching processor and the second switching processor perform a switching process, wherein the first switching section and the second switching section are paired, and the controller is placed in one of two switching sections paired.

4. The switching method according to claim 3, wherein:

the first switching section further includes a plurality of first storage units which store the plural pieces of data according to destination;

the second switching section further includes a plurality of second storage units which store the plural pieces of data according to destination;

bypass-transmission from the first switching processor to the second switching processor is performed at the time of capacity of a first storage unit that stores plural pieces of data destinations of which are the same being greater than or equal to a threshold and capacity of a second storage unit that stores bypass-transmitted pieces of data the destinations of which are the same being smaller than a threshold;

bypass-transmission from the first switching processor to the second switching processor is not performed at the time of the capacity of the first storage unit that stores the plural pieces of data the destinations of which are the same being greater than or equal to the threshold and the capacity of the second storage unit that stores the bypass-transmitted pieces of data the destinations of which are the same being greater than or equal to the threshold;

bypass-transmission from the second switching processor to the first switching processor is performed at the time of capacity of a second storage unit that stores plural pieces of data destinations of which are the same being greater than or equal to a threshold and capacity of a first storage unit that stores bypass-transmitted pieces of data the destinations of which are the same being smaller than a threshold; and bypass-transmission from the second switching processor to the first switching processor is not performed at the time of the capacity of the second storage unit that stores the plural pieces of data the destinations of which are the same being greater than or equal to the threshold and the capacity of the first storage unit that stores the bypass-transmitted pieces of data the destinations of which are the same being greater than or equal to the threshold.

* * * * *